United States Patent [19]

Hirsch

[11] Patent Number: 5,119,432
[45] Date of Patent: Jun. 2, 1992

[54] FREQUENCY DIVISION, ENERGY COMPARISON SIGNAL PROCESSING SYSTEM

[75] Inventor: Peter Hirsch, Denville, N.J.

[73] Assignee: Visidyne, Inc., Burlington, Mass.

[21] Appl. No.: 611,935

[22] Filed: Nov. 9, 1990

[51] Int. Cl.[5] .......................... G06K 9/00; G10L 5/00
[52] U.S. Cl. ............................................ 382/1; 73/648; 324/77 E; 364/484; 381/45; 382/17; 382/29
[58] Field of Search ................. 382/1, 17, 29; 381/45; 364/484; 73/648; 324/77 E; 367/32, 43

[56] References Cited

U.S. PATENT DOCUMENTS

| | | | |
|---|---|---|---|
| 3,509,534 | 4/1970 | Partin | 382/17 |
| 3,731,188 | 5/1973 | Smith | 324/77 E |
| 4,718,097 | 1/1988 | Uenoyama | 324/77 E |

*Primary Examiner*—Leo H. Boudreau
*Attorney, Agent, or Firm*—Iandiorio & Dingman

[57] ABSTRACT

A frequency division, energy comparison processing system which decomposes a wide-band signal into a plurality of narrow frequency band components, generates the energy envelope of each of those narrow band components, and compares a function of each energy envelope with the same function of each of the other energy envelopes to obtain a pattern of the function comparisons indicative of at least one of the sources contributing to the wide-band signal.

12 Claims, 6 Drawing Sheets

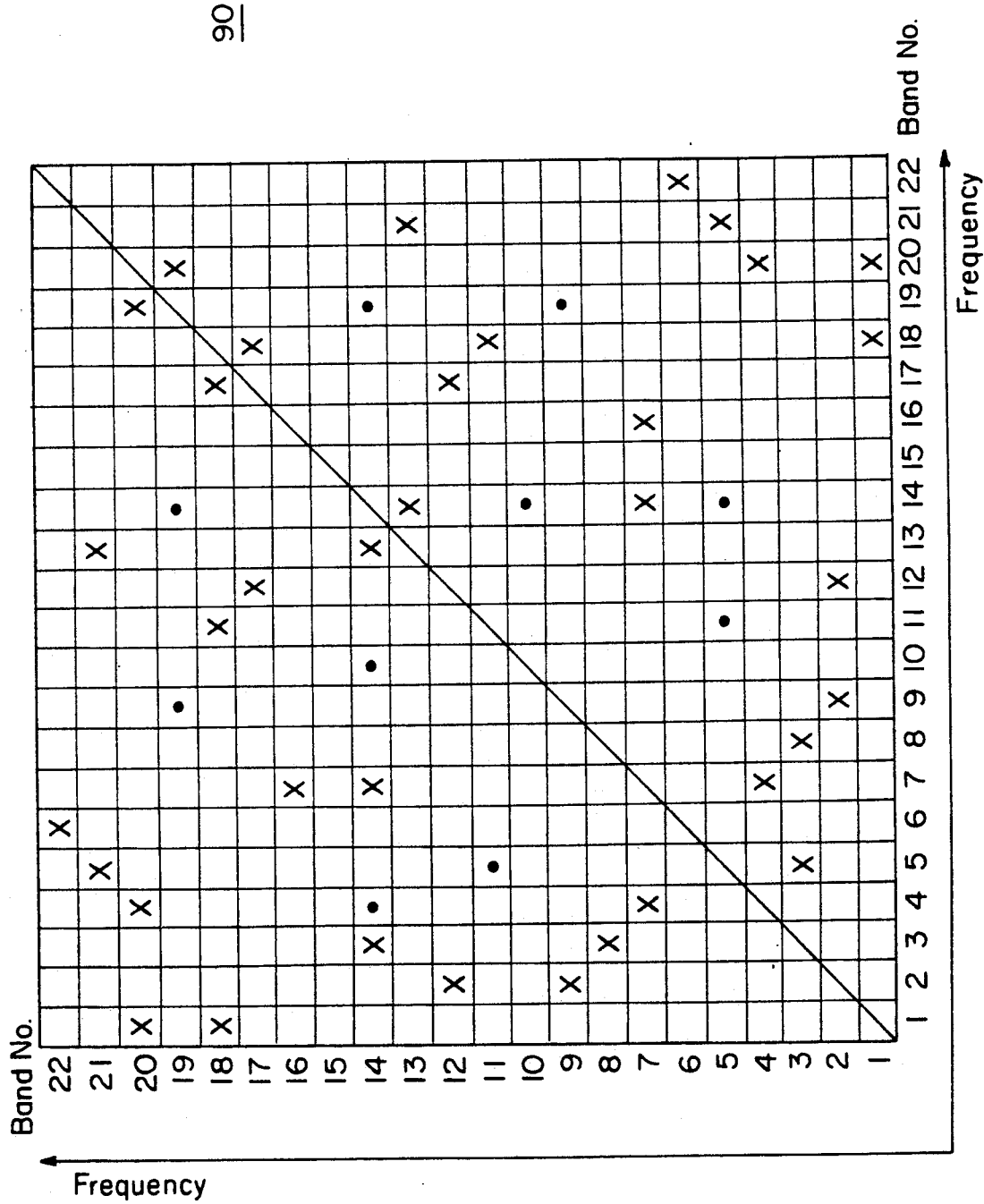

FREQUENCY DIVISION, ENERGY COMPARISON SIGNAL PROCESSING SYSTEM

FIELD OF INVENTION

This invention relates to a frequency division, energy comparison signal processing system to detect the presence of, and separate the contributions from, multiple sources that compose a wide band signal.

BACKGROUND OF INVENTION

There are numerous situations in which it would be desirable to detect the presence of, and separate the contributions from, multiple sources that compose a wide band signal. For example, it is desirable to detect, localize and classify long range contacts or sources of sound in passive surveillance of the sub-surface ocean. Currently, such information is discerned using two or more physically spaced, directional, multi-channel receivers. Each receiver scans in azimuth across the surveillance area at a single frequency, and plots the power of the received signal; the receiver steps through a number of discrete frequencies in this manner to obtain a directional frequency spectrum. Localization is accomplished by cross-fixing a source detected by the two receivers. The spectrum of each single, localized contact is then compared to a library of the spectral signatures of known contacts for classification. In this case, the spatial information is necessary to permit the separation of the contributors to the wide band signal.

Although such systems are able to detect, localize and classify contacts, they have a number of drawbacks which make them less than ideal solutions to the problem. For one, these systems require two receivers to separate the contributors on the basis of their separate locations. Further, since any single detected source is not necessarily unique to a contact, classification is typically based on a number of detected sources. Therefore, it is necessary to first determine that the multiple sources belong to a single contact. Accordingly, unambiguous classification typically requires that the system first localize the sources by cross-fixing using two directional receivers. Alternatively, a single contributor may be discerned by comparing a multitude of detected sources to a previously-established library of the unique sources associated with known contributors. However, this requires that the emission spectrum of the contributor has been previously mapped and that the sources be loud enough to be clearly dominant. Classification may then be based on the source signals emanating from that single contributor. Accordingly, the detection and classification of contacts requires either equipment redundancy or loud signals plus a library of known contacts. In addition, the multiple-receiver technique is relatively expensive because directionality requires physically large receivers.

There are other situations in which it would be desirable to detect the presence of, and separate the contributions from, multiple sources that compose a wide band signal. For example, in X-ray and radio astronomy it is desirable to detect and classify X-ray and radio sources. However, due to the distances involved it is impossible to determine the range to a source by cross-fixing. Accordingly, to date it has not been possible to unambiguously separate astronomical X-ray and radio sources within a wide-band x-ray and radio source, when they all lie in the same direction in space. It would also be desirable to determine information from EKGs and from brain waves captured by electroencephalograph. To date, however, it has not been possible to use an EEG to predict the onset of an unusual brain event.

SUMMARY OF INVENTION

It is therefore an object of this invention to provide a frequency division, energy comparison signal processing system which can detect the presence of, and separate the contributions from, multiple sources that compose a wide band signal using only a single receiver.

It is a further object of this invention to provide such a system which can detect the presence of, and separate the contributions from, multiple sources that compose a wide band signal without first localizing the source.

It is a further object of this invention to provide such a system which maps the spectrum of a signal source with a single receiver.

It is a further object of this invention to provide such a system which can associate signals with a source without prior knowledge of the source location.

It is a further object of this invention to provide such a system which can associate signals with a source without prior knowledge of the source emission spectrum.

It is a further object of this invention to provide such a system which detects ocean contacts.

It is a further object of this invention to provide such a system which can map the signature of an undersea contact without the need for localization.

It is a further object of this invention to provide such a system which detects the onset of an unusual brain event.

It is a further object of this invention to extract new diagnostic information from electrocardiograms (EKGs).

It is a further object of this invention to provide such a system which allows for unambiguous separation of multiple astronomical X-ray and radio sources, when they all lie in the same direction in space.

This invention results from the realization that the contributions from a single signal source in a wide-band signal may be quickly and easily detected by observing similarities in the signal energy envelopes of a number of discrete narrow frequency bands of the wide-band signal.

This invention features a frequency division, energy comparison signal processing system which decomposes a wide band signal into a plurality of narrow frequency band components, generates the energy envelope of each of the narrow band components, and compares a function of each energy envelope with the same function of each of the other energy envelopes to obtain a pattern of the function comparisons indicative of at least one of the sources contributing to the wide-band signal.

Preferably, the wide-band signal is decomposed by filtering it at a plurality of discrete frequency bands. The energy envelope function comparison may be accomplished by first normalizing each energy envelope and then multiplying each normalized envelope with a number of the other normalized envelopes to obtain a plurality of envelope correlation coefficients. In that case, the system may further establish one or more correlation coefficient threshold values and count the number of correlation coefficients greater than each of those threshold values. Alternatively, the system may determine the relationship between correlation coefficients of multiple narrow frequency band components to establish one or more clusters of envelopes that are correlated with each other to indicate the presence and the spectrum of one or more signal sources.

DISCLOSURE OF PREFERRED EMBODIMENT

Other objects, features and advantages will occur to those skilled in the art from the following description of a preferred embodiment and the accompanying drawings, in which:

FIG. 7 is a matrix similar to that of FIG. 5 illustrating the correlation coefficients of a brain wave scan during normal activity and on the detection of the onset of an unusual brain event.

Figure 1:
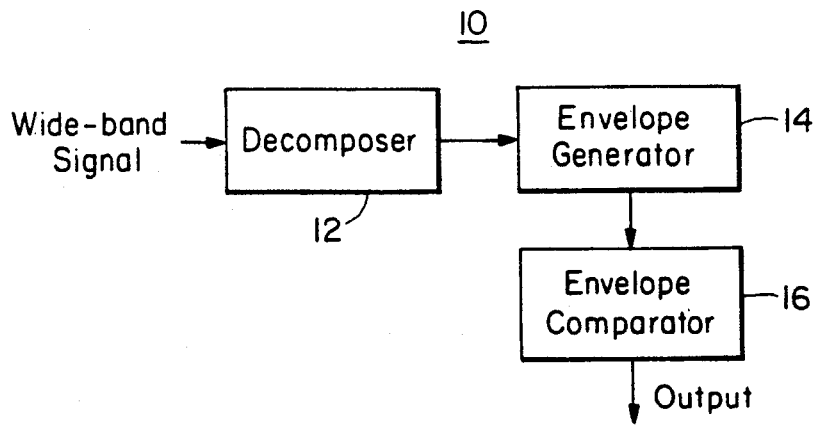
FIG. 1 is a simplified block diagram of the frequency division, energy comparison, signal processing system according to this invention.

There is shown in FIG. 1 frequency division, energy comparison, signal processing system 10 according to this invention for detecting the presence of, and separating the contributions from, multiple sources that compose a wide band signal. System 10 includes decomposer 12 for decomposing the wide-band signal into a number of bands, which may be narrow or broad, contiguous, spaced, or overlapping. Preferably, decomposer 12 creates narrow, discrete bands in each of which a single contact or signal source dominates the band spectrum. Envelope generator 14 generates the energy envelope of each of the bands from decomposer 12. Each of those envelopes is then compared to each of the other envelopes in envelope comparator 16. Patterns in such envelope comparisons, including statistically significant groupings of similar envelopes indicative of sources contributing to the wide-band signal, may then be identified for detection of a signal source.

Figure 3A:
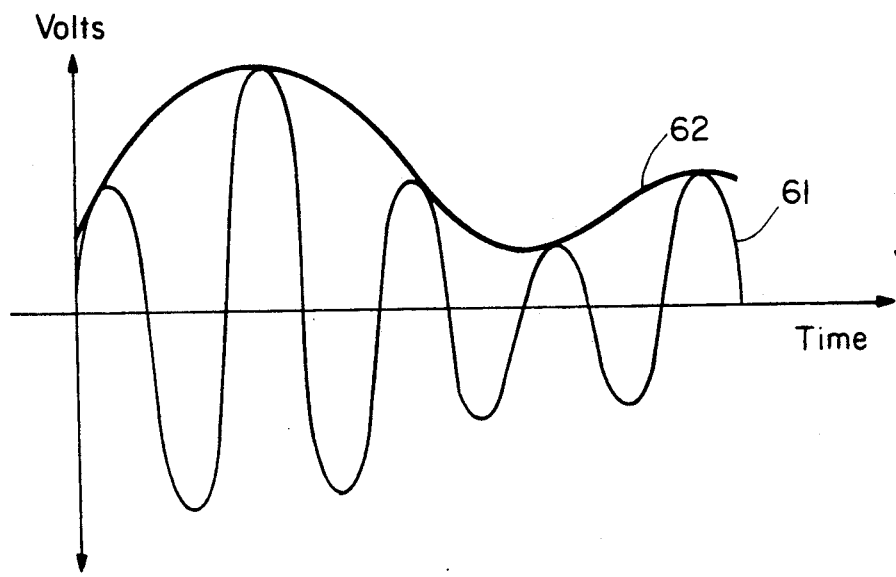
FIGS. 3A and 3B are examples of two signals from the decomposer of FIG. 2, and the energy envelopes generated from those signals by the system of FIG. 2.
Figure 3B:
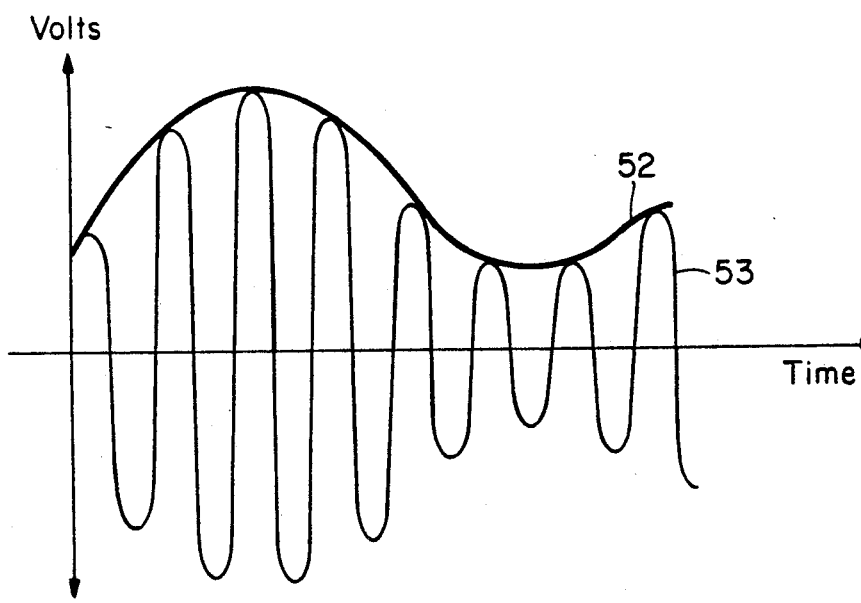
Figure 2:
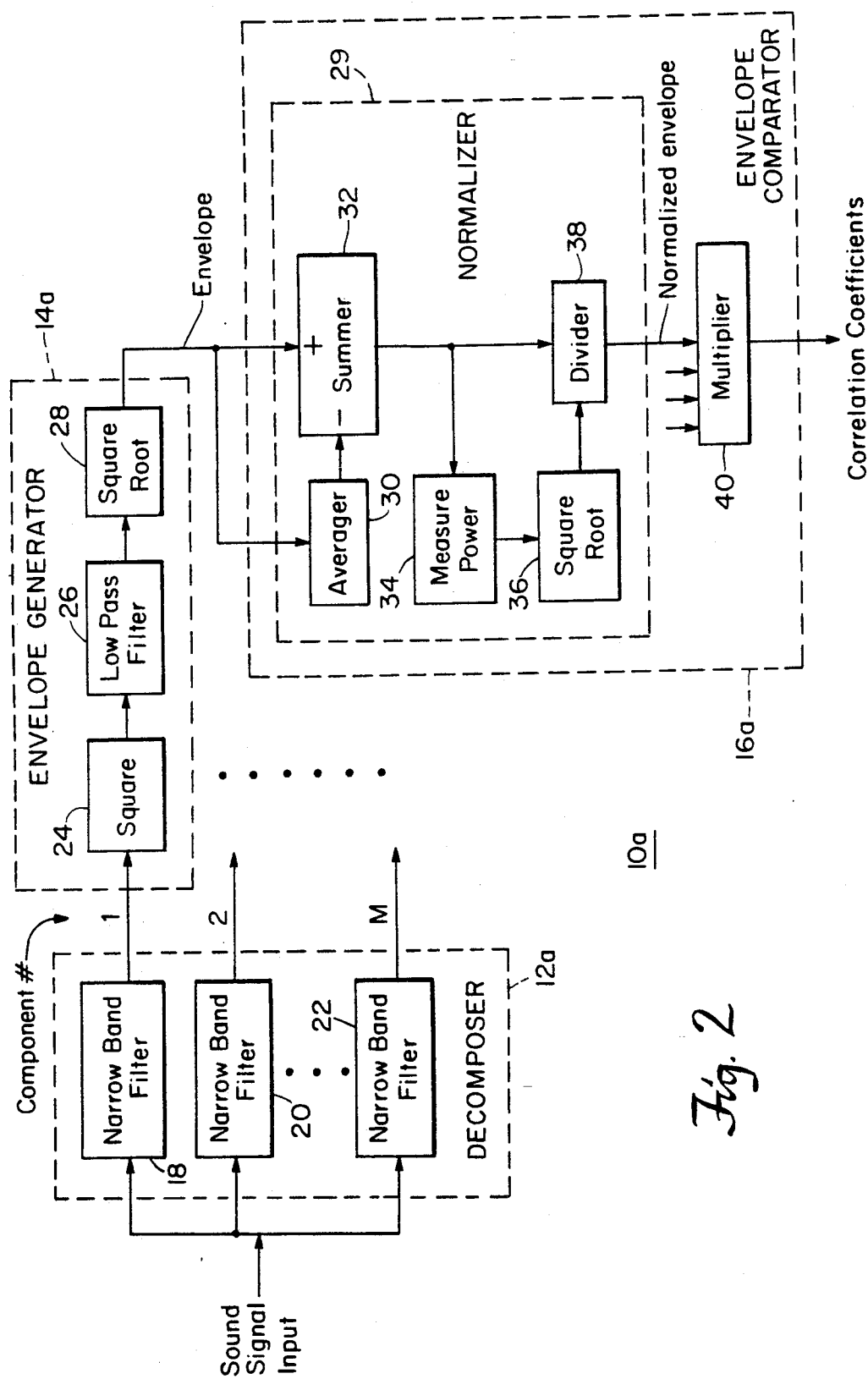
FIG. 2 is a more detailed block diagram of an embodiment of the system of FIG. 1.

A more detailed embodiment of system 10a according to this invention is shown in FIG. 2. Decomposer 12a includes a number of narrow band filters such as filters 18, 20, ... 22 for creating signal components 1, 2, ... M, respectively. Preferably, each narrow band filter has the same narrow bandwidth, and the bands do not overlap. It is also preferred that the center frequency of each narrow band filter is an integral multiple of the center frequency of narrow band filter 18 having the lowest center frequency. For example, filter 20 may have a center frequency twice that of filter 18, the next filter three times that center frequency, and so forth, up to the final filter 22, which would have a center frequency of M times the center frequency of filter 18. Examples of outputs of two such filters, for example filters 18 and 20, are shown in FIGS. 3A and 3B; signal 53 from filter 20 has twice the center frequency of signal 61 from filter 18, while envelope 52 resembles — is correlated with — envelope 62.

The series of filtered signals emanating from decomposer 12a enter a number of parallel envelope generators such as generator 14a, FIG. 2. In practice there would be one such envelope generator for each narrow band component 1 through M but only one is shown here for clarity. The envelopes are generated by squaring the narrow band signal in squaring circuit 24, filtering the squared signal with low pass filter 26, and taking the square root of the filtered signal with circuit 28. Envelope 62 of signal 61 and envelope 52 of signal 53 are illustrated in FIGS. 3A and 3B.

The envelope signals then enter envelope comparator 16a, which includes envelope normalizer 29 and multiplier 40. In practice, there would be a normalizer for each envelope; only one is shown for clarity. In normalizer 29, the envelope signal is averaged in circuit 30, and the average is subtracted from the envelope in summer 32. The power of the difference signal is then measured in circuit 34, and its square root taken in circuit 36. The difference signal from summer 32 is then divided by the square root of the power signal in circuit 38 to create a normalized envelope signal, which is then applied to multiplier 40. Multiplier 40 multiplies each normalized envelope by each of the other normalized envelopes from wide band signal components 1 through M to determine the correlation coefficient of each possible pair of normalized envelopes. The correlation coefficients may then be analyzed as further described below to detect the presence of, and separate the contributions from, multiple sources that compose a wide band signal.

Figure 4:
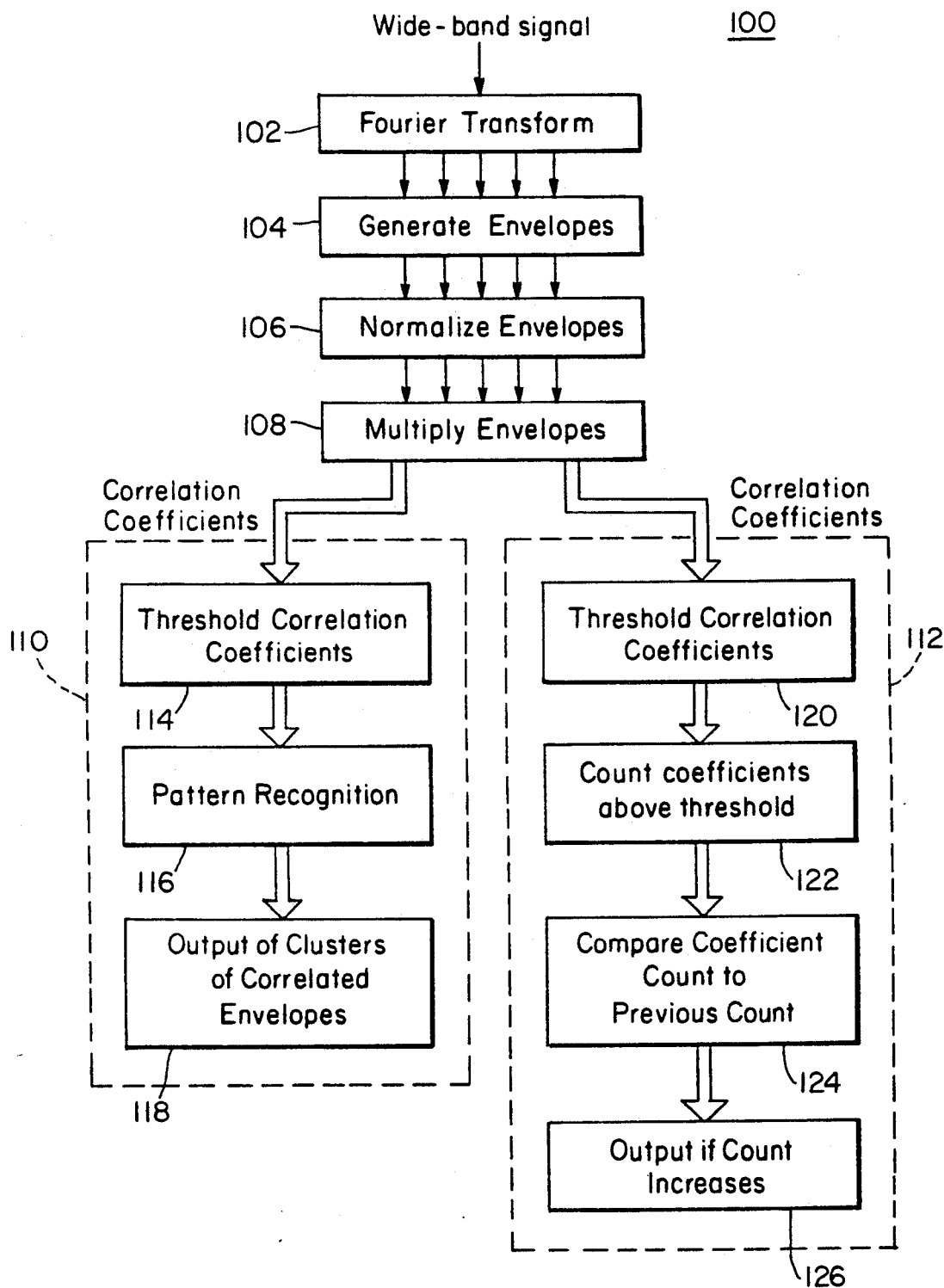
FIG. 4 is a block diagram of methods of detecting a subsurface ocean contact and the onset of an unusual brain event using the system of this invention.

The use of system 10a for detecting a sub-surface ocean contact and the onset of an unusual brain event is illustrated in FIG. 4. Detection method 100 includes first step 102 in which the wide-band input signal, in this case either a sound signal from an undersea receiver or a brain wave signal from an electroencephalograph, is Fourier transformed. Preferably, the wide-band signal is sampled over a time T divided into N time segments of equal length, and each segment is decomposed into M discrete wavelength bands. One discrete Fourier transform is performed on each segment to create $N \times M$ complex coefficients.

At step 104 the envelope of each narrow band component is determined by taking the square root of the sum of the squares of the real and imaginary components of each Fourier coefficient. The result is a matrix of $N \times M$ real coefficients arranged as N rows and M columns. Each envelope is normalized, step 106, by calculating the mean of each column and subtracting the mean from the envelope, calculating the sample variance of each column, taking the square root of the variance, and dividing the difference between the envelope and the column mean by the square root. The system in step 108 then calculates the correlation coefficients of all possible pairs of matrix columns or envelopes by multiplying the pairs of normalized envelopes, resulting in $M \times (M-1)/2$ independent correlation coefficients.

For detection of undersea contacts, branch 110 of method 100 is followed. At step 114, the system compares the correlation coefficients to a previously established threshold value, the choice of which would be apparent to one skilled in the art dependent on the specific situation. At step 116, the system looks for patterns in the correlation coefficients above the threshold, as is discussed below in connection with FIG. 5. The patterns show the existence of clusters of envelopes, all of which are correlated with each other and which thus indicate the existence of a single source of all the narrow band components that make up each cluster. At step 118, the system has an output for each group or cluster of correlated envelopes.

Figure 5:
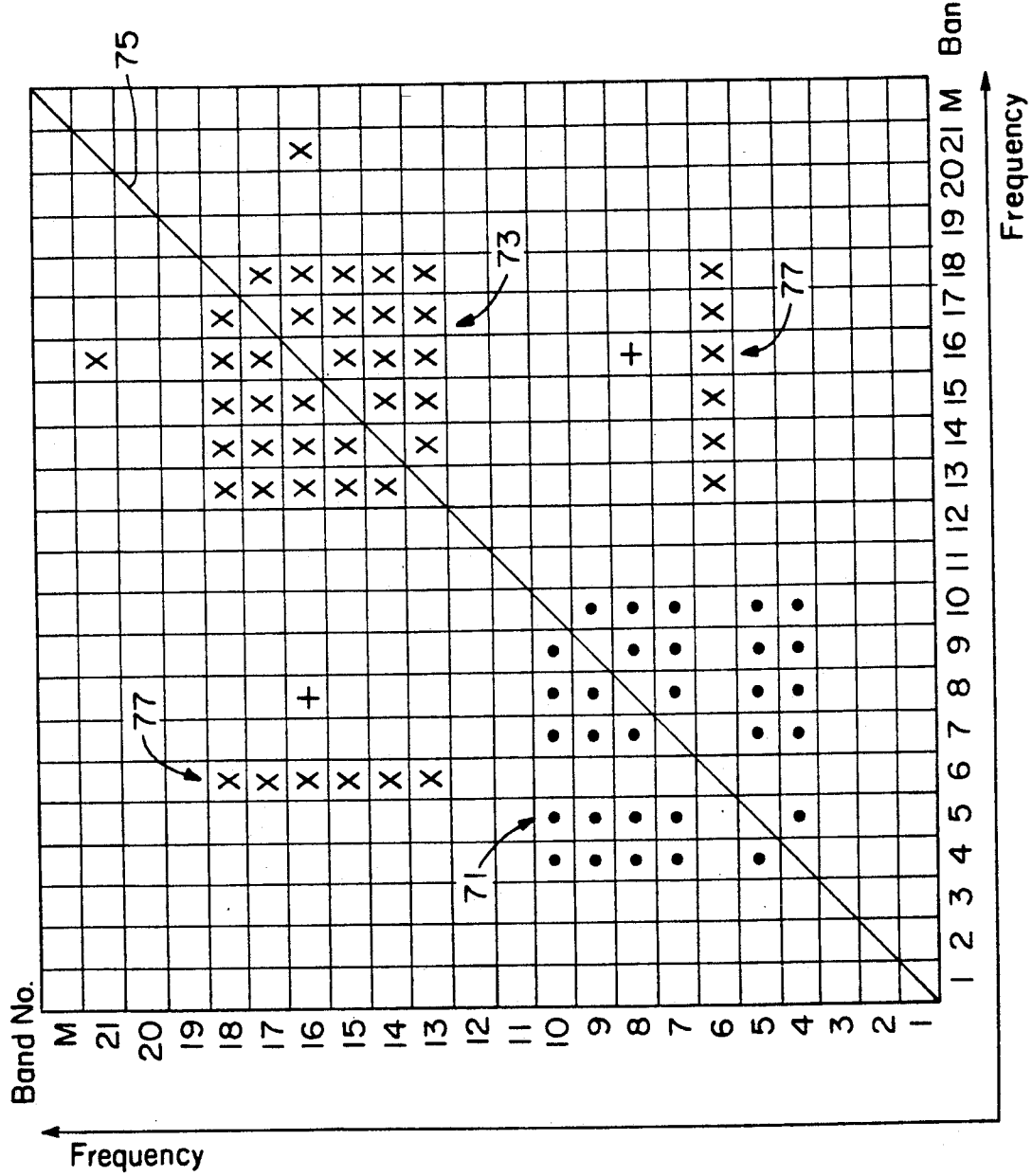
FIG. 5 is an example of a cross-correlation matrix partially illustrating the patterns of correlation coefficients resolved by the system of this invention for detecting a signal source.

A simplified example of an M by M matrix which illustrates the principle of this coefficient pattern recognition is shown in FIG. 5. The example is simplified by reducing the range of possible correlation coefficients (which in actuality is from $-1$ to $+1$) to just two: either below some threshold or above it. The sufficiently correlated envelope pairs are here marked with an X or a dot, as described below. The system first identifies clusters of highly correlated envelopes — complete or incomplete square areas within the M by M correlation coefficient matrix. Two separate clusters, area 71 from band 4 to band 10, and area 73 from band 13 to band 18, are here identified; the correlation coefficients identified with area 71 are designated with a dot in the chart; those associated with area 73 are designated with an x. Since the two sides of the matrix separated by diagonal 75 are mirror-images, any correlation of the envelopes of three or more adjacent wavelength bands will create a square shape. Such square shapes need not be continuous, as one or more linear areas may be in essence missing, as shown by linear area 77 at band 6 missing from square area 71.

The pattern recognition system then recognizes linear areas of high correlation and associates those linear areas with a previously identified square area. For example, single linear area 77, denoting correlation of band 6 with bands 13 through 18, may be unambiguously associated with area 73 because band 6 is not associated with area 71, but bands 13 through 18 are associated with area 73. Finally, the system identifies single correlations which can be unambiguously associated with a previously identified square area. For example, the system associates the single correlation of the envelopes of bands 16 and 21 with area 73. The band at frequency 21 is thus associated with bands 13 through 18. The correlation of the envelopes of bands 8 and 16 may not be unambiguously associated with either previously identified contact area 71 or 73. Accordingly, the correlation of bands 8 and 16 is ignored. It is a major purpose of the correlation analysis to minimize the effect of such ambiguities.

Figure 6:
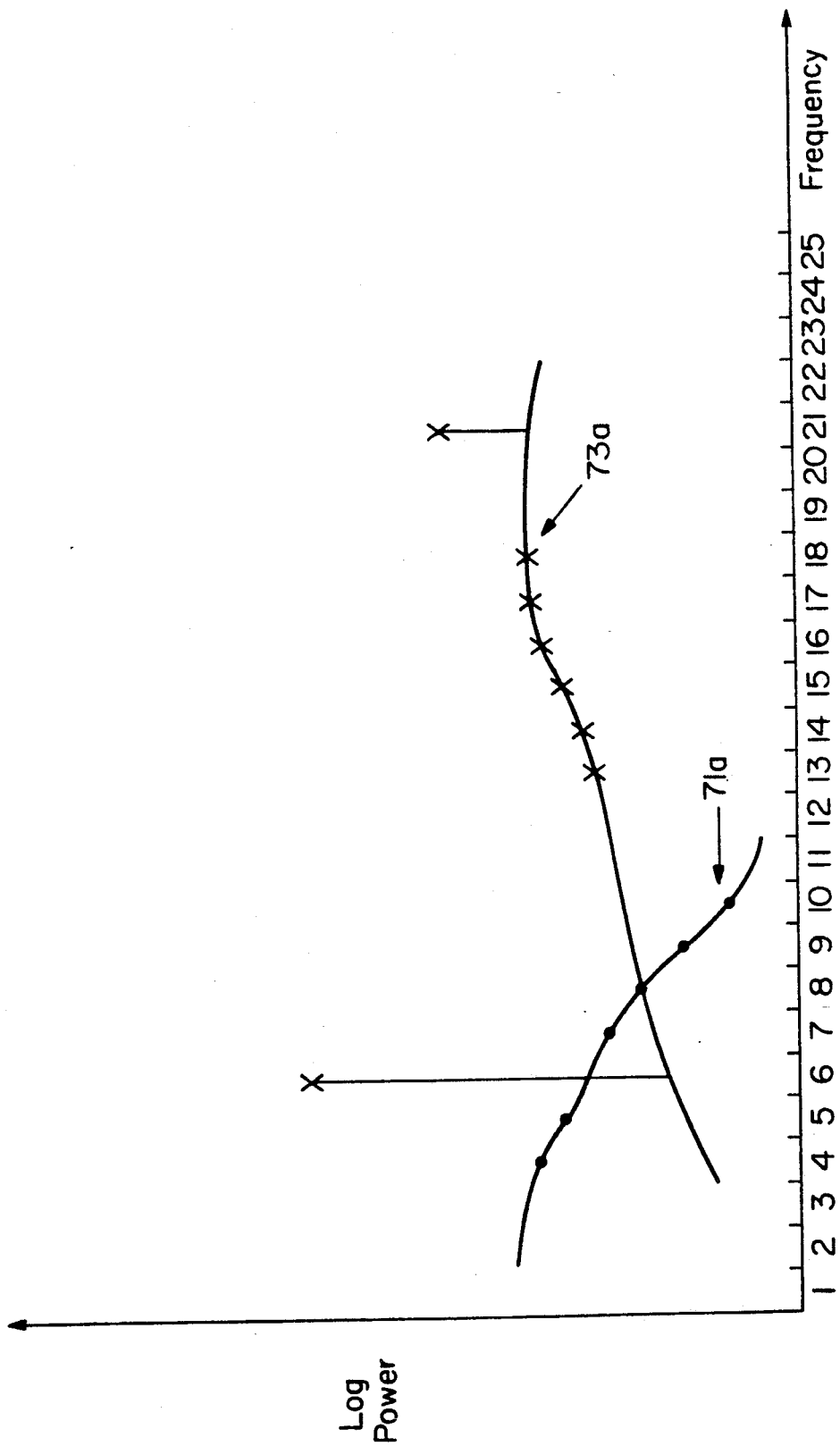
FIG. 6 is an example of an output of the system of this invention for the two separate undersea contacts detected as illustrated in FIG. 5.

An example of an output from step 118, FIG. 4, for the example of the cross correlation matrix of FIG. 5, is shown in FIG. 6. Graph 73a is a plot of frequency versus the log of the detected signal power for contact 73 represented by the X's in FIG. 5. The system indicates the detection of a single contact emitting within: narrow frequency bands 13 through 18, representing square area 73; narrow frequency band 6 representing linear area 77; and narrow frequency band 21, representing the single correlation of bands 16 and 21 Similarly, graph 71a is the output for the second contact 71, represented by the dots in FIG. 5, from which emission is detected in the narrow frequency bands 4, 5, and 7 through 10.

The patterns in the correlated envelope pairs indicative of undersea contacts are believed to be due to the fact that sound sources typically emit in a number of narrow frequency bands that may be adjacent or not. As the sound waves propagate through the water, they are attenuated similarly, causing the energy envelopes of the detected narrow band frequency signals emanating from a contact to have similar shapes, which results in a high degree of correlation between the envelope pairs of these narrow frequency bands. This phenomenon would account for the areas of highly correlated envelope pairs such as areas 71, 73, and 77, FIG. 5.

It is also known that the emission spectrums of separate undersea contacts often will overlap. However, the system of this invention is able to unambiguously associate sounds at discrete narrow wavelength bands with a single contact, regardless of such overlap, because the system looks for correlations between envelopes of each band and every other band; high correlation between envelopes indicates that the signals in those bands are all from a single contact.

For use in the analysis of brain wave activity, system 100, FIG. 4, takes path 112 after step 108. First, the correlation coefficients are compared to a preestablished coefficient threshold value, step 120. The correlation coefficients above the threshold value are then counted, step 122. The count of correlation coefficients above the threshold value is compared to the previous count of correlation coefficients above the threshold, step 124, and the system has an output if the count has increased, step 126.

An example of a correlation coefficient cross-correlation matrix illustrating the principle of such a detected increase in the number of correlation coefficients above the threshold value is shown in FIG. 7. Matrix 90 has mapped therein the envelope pairs having a correlation coefficient value above the selected threshold at a first time, illustrated by the dots, and at a second, later time, illustrated by the X's. As can be seen, the number of sufficiently correlated envelope pairs has increased from a statistically insignificant number at the first time to a statistically significant number at the second time. The increase in correlations is not accompanied by the patterning of correlated envelope pairs as found in the detection of undersea contacts illustrated in FIG. 5. Such increases in correlated envelopes indicative of a significant change in brain activity appear to precede unusual brain events such as epileptic seizures, allowing the system of this invention to be useful in the prediction and analysis of such seizures.

Although the preferred embodiments have been described for detection of undersea contacts and the analysis of brain waves, these examples are not meant to limit the invention; the signal processing system of this invention supplies information heretofore not available in the art of passive wide-band signal reception and analysis. The system can be used in any situation in which it is desired to extract information from a previously undescribed wide-band signal from a source not under the control of the receiver, for example in the analysis of electrocardiogram signals.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A frequency division, energy comparison signal processing system, comprising:
   means for decomposing a wide-band signal into a plurality of narrow frequency band components;
   means for generating the energy envelope of each of the narrow band components; and
   means for comparing a function of each energy envelope with the same function of each of the other energy envelopes to obtain a pattern of the function comparisons indicative of at least one of the sources contributing to the wide-band signal.

2. The system of claim 1 in which said means for decomposing includes means for filtering said wide-band signal at a plurality of discrete frequency bands.

3. The system of claim 1 in which said means for comparing includes means for normalizing each energy envelope.

4. The system of claim 3 in which said means for comparing further includes means for multiplying each normalized envelope with a number of the other normalized envelopes to obtain a plurality of envelope correlation coefficients.

5. The system of claim 4 in which said means for comparing further includes means for establishing a correlation coefficient threshold value.

6. The system of claim 5 in which said means for comparing further includes means for counting the number of correlation coefficients greater than said threshold value.

7. The system of claim 4 in which said means for comparing further includes means for detecting patterns in the relationships between envelope correlation coefficients.

8. The system of claim 7 in which said means for detecting patterns in the relationships includes means for establishing a correlation coefficient threshold value.

9. The system of claim 8 in which said means for detecting patterns in the relationships further includes means for resolving which of the correlation coefficients are greater than said threshold value.

10. The system of claim 9 further including means, responsive to said means for comparing, for indicating the presence of a source when the correlation coefficients associated with at least three narrow frequency band components are greater than said threshold value.

11. The system of claim 10 further including means for discerning additional components of the source, on the basis of the correlation of additional envelopes with the envelopes of said at least three component bands.

12. A frequency division, energy comparison signal processing system for detecting the presence of, and separating the contributions from, multiple sources that compose a wide band signal, comprising:
   means for dividing a wide-band sound signal into a plurality of discrete narrow frequency band components;
   means for generating the energy envelope of each of the narrow band components;
   means for normalizing each said envelope;
   means for multiplying each normalized envelope with a number of other normalized envelopes to obtain a plurality of envelope correlation coefficients; and
   means for analyzing the correlation coefficients to obtain a pattern of correlation coefficients indicative of the presence of one or more sound sources and their spectrums.

* * * * *